United States Patent [19]

Kobayashi

[11] Patent Number: 4,514,477
[45] Date of Patent: Apr. 30, 1985

[54] CASSETTE-TYPE POWER UNIT FOR A MOTOR TOY

[75] Inventor: Masao Kobayashi, Tokyo, Japan

[73] Assignee: Shinsei Kogyo Co., Ltd., Tokyo, Japan

[21] Appl. No.: 534,654

[22] Filed: Sep. 22, 1983

[30] Foreign Application Priority Data

Sep. 25, 1982 [JP] Japan .......................... 57-145259[U]

[51] Int. Cl.³ .......................... H01M 2/02; H01M 2/20
[52] U.S. Cl. .......................... 429/98; 429/99; 429/123; 446/456; 446/462
[58] Field of Search .................. 429/96–100, 429/1, 123, 178; 46/45, 201, 230, 248, 249, 251

[56] References Cited

U.S. PATENT DOCUMENTS

| | | | |
|---|---|---|---|
| 1,682,764 | 9/1928 | Mohr | 46/211 X |
| 3,181,974 | 5/1965 | Barbera | 429/123 X |
| 3,702,037 | 11/1972 | Toy et al. | 46/201 |
| 3,887,394 | 6/1975 | Kaye | 429/99 |
| 4,091,187 | 5/1978 | Kaye | 429/100 X |
| 4,383,007 | 5/1983 | Murphy | 429/96 X |
| 4,438,589 | 3/1984 | Matsushiro | 46/251 |

Primary Examiner—Thony Skapars

[57] ABSTRACT

A cassette-type power unit for a motor toy is disclosed, which comprises a rectangular casing provided at its middle part with a partition; connecting terminals for connecting a plurality of batteries in series; contact pieces provided as power terminals on an outer face of the casing; and holding pieces each provided with a flange for serving as a guide and a stopper upon connection to the motor toy.

The cassette-type power unit allows the convenient replacement of batteries, especially for a wireless controllable toy car, and enables a variety of controlling operations to be readily effected by use of a single unit.

5 Claims, 7 Drawing Figures

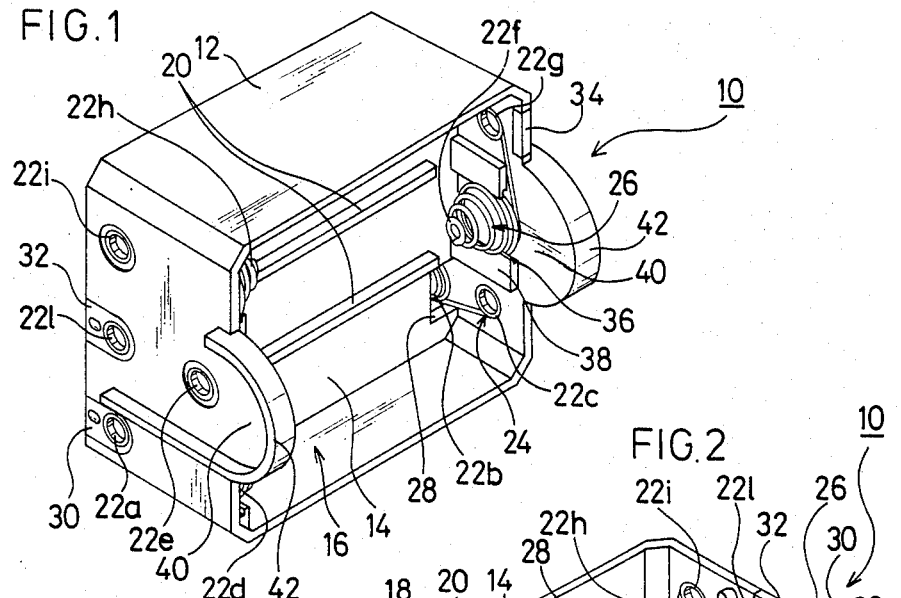
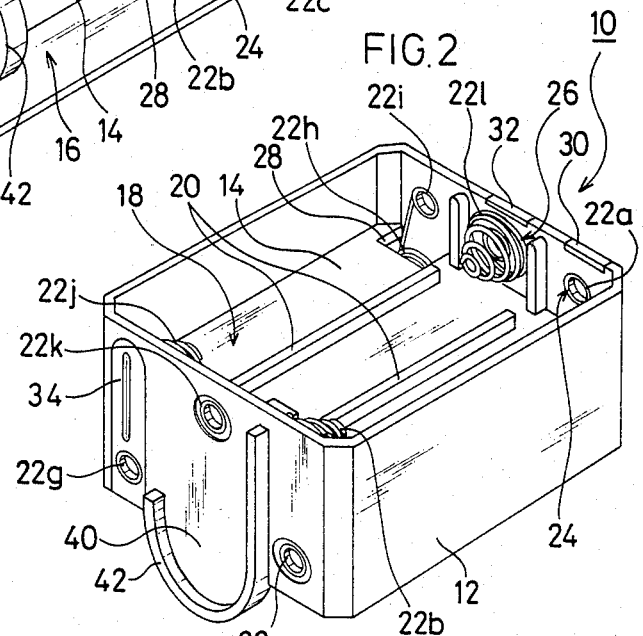
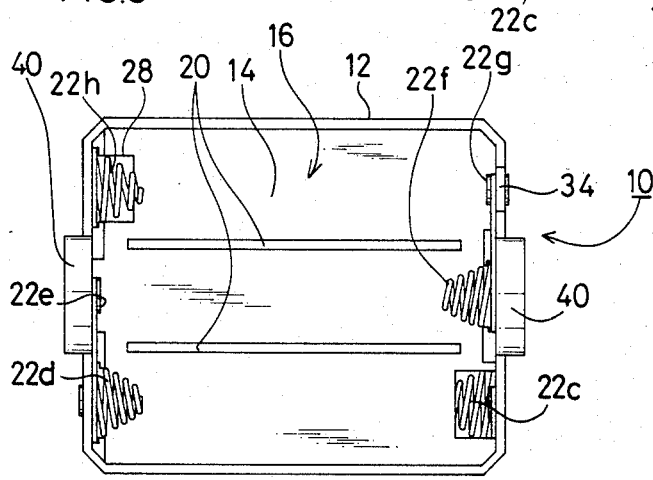
FIG.1
FIG.2
FIG.3

CASSETTE-TYPE POWER UNIT FOR A MOTOR TOY

FIELD OF THE INVENTION

This invention relates to a cassette-type power unit, more particularly to a cassette-type power unit for use as a power source in a remote controllable motor toy, which allows convenient replacement of batteries.

BACKGROUND OF THE INVENTION

A conventional power source has been constructed, in general, by replaceably receiving batteries directly within a battery chamber arranged in a toy body. As a result, for a wireless controlling toy car there must be used separate power sources for a driving motor and for a wireless receiver, which requires inconvenient replacement upon deletion of batteries. Further, requirement of a large number of batteries imposes limitation upon a space for arranging a battery receiving chamber and upon a location therefor so as to avoid imbalance between weights of the car body and of the batteries.

SUMMARY OF THE INVENTION

An object of the invention is to provide a cassette-type of power unit which is conveniently replaceable in a given space of a motor toy, comprising a single casing for receiving a given number of batteries and a plurality of connecting terminals for supplying a maximum voltage and a partial voltage.

Another object of the invention is to minimize the number of batteries to be received in the power unit for providing a compact power source and to mount the power unit on an imbalance position of the toy car for permitting an electric driving.

The objects described hereinabove may be achieved in accordance with the invention by providing a cassette-type power unit for a motor toy which comprises a rectangular casing provided at its middle with a partition, at either side of which is arranged each battery chamber for receiving a plurality of batteries in parallel; connecting terminals for ensuring all batteries in the battery chambers to be connected in series; contact pieces provided as power terminals on an outer face of the casing and conductive to an extreme pair of and a middle one of said connecting terminals; and holding pieces protruded from the casing at its opposite sides, each of said holding pieces being provided with a flange for serving as a guide and a stopper upon connection to the motor toy.

The invention will be described hereinafter in more detail for the preferred embodiments with reference to the accompanying drawings.

BRIEF DESCRIPTION OF THE DRAWINGS

FIG. 1 is a front perspective view of a cassette-type power unit according to the invention;

FIG. 2 is a back perspective view of the cassette-type power unit of FIG. 1;

FIG. 3 is a front view of the cassette-type power unit of FIG. 1;

PREFERRED EMBODIMENTS OF THE INVENTION

Figure 4:
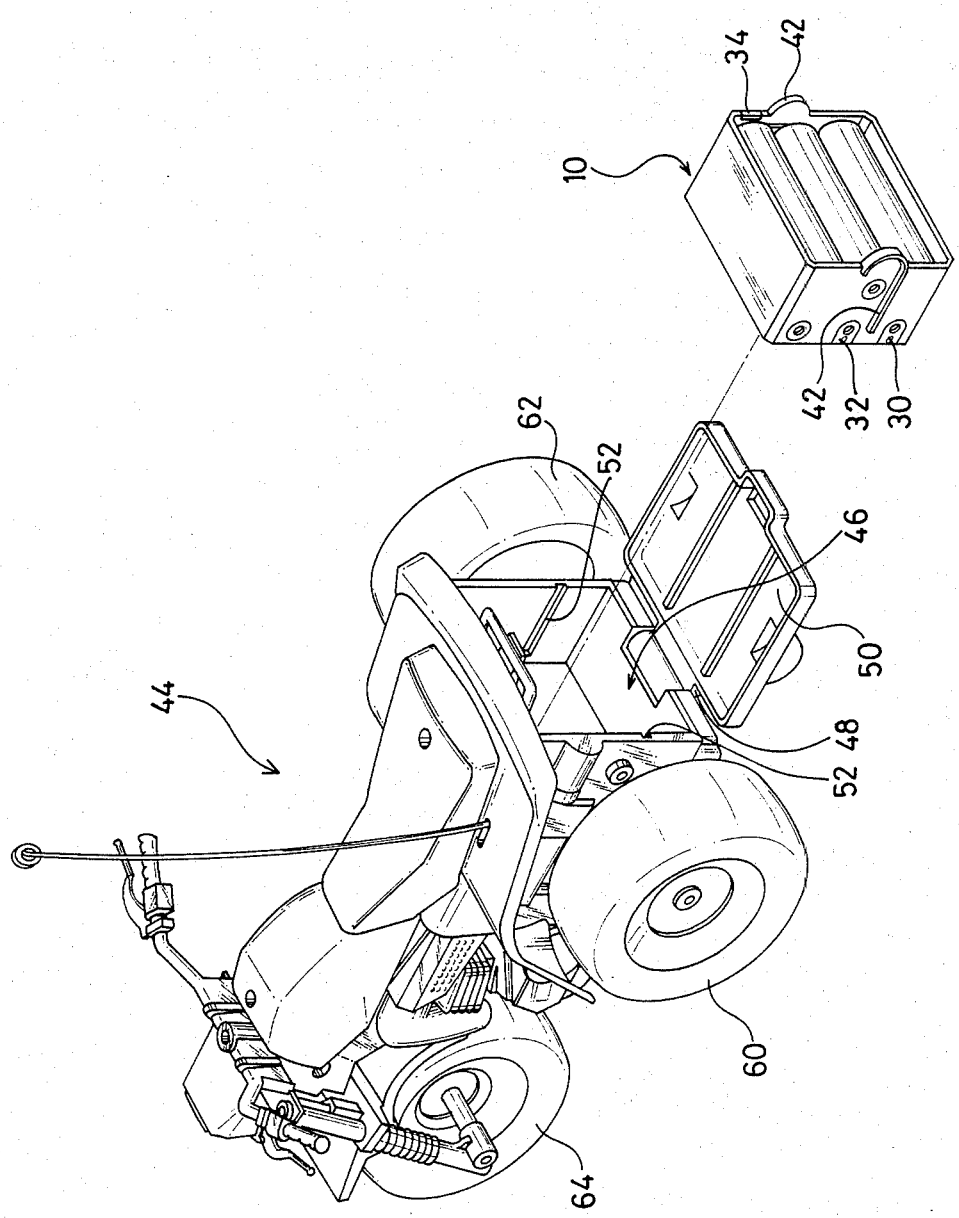
FIG. 4 is a pictorial illustration showing the mounting operation of the cassette-type power unit of the invention to the motor toy.

As shown in FIGS. 1 through 3, a cassette-type power unit 10 comprises a rectangular casing 12 which at its inner middle part is provided with a partition 14. At either side of the partition 14 are arranged battery-receiving chambers 16, 18. The partition 14 at its either face are provided with each two protrusions 20, 20 spaced apart at an equal distance. The protrusions 20, 20 allow three batteries (not shown) to be received in parallel within each battery-receiving chamber 16, 18. Thus, total six batteries are received within the casing 10 according to this embodiment.

Opposite side walls of the casing 12 at their inner faces are provided with connecting terminals 22a to 22l at positions corresponding to elecrodes of of the batteries to be received in the battery-receiving chambers 16, 18. These connecting terminals 22a to 22l comprise (+) terminals of conductive eyelet fitment and (−) terminals of conductive coil spring, wherein adjacent terminals 22d and 22e, 22f and 22g, as well as 22j and 22k are connected as a pair terminals for different polarities. In other words, the conductive coil spring at its one end is stretched to wind around the conductive eyelet fitment 24 with caulking, thereby to achieve mutual conductive connection between the adjacent terminals of different polarities. The terminals 22b and 22c as well as 22h and 22i located at opposite corners also connected with each other through cutout portions 28, 28 provided at the partition 14. The adjacent terminals 22a, 22l on one of the battery-receiving chamber 18 are attached to contact pieses 30, 32 as external terminals on an outer surface of the casing 12. The cassette-type power unit thus constructed receives six batteries in total at their determined polarities within the casing 10, thereby to connect these batteries in series between the extreme terminals 22a and 22l for obtaining a full voltage of the batteries. Similarly, the terminal 22g on the other chamber 16 is attached to a contact piece 34, through which a half voltage may be obtained between the contact pieces 30 and 32.

In the casing of the cassette-type power unit according to the invention, for example, the (−) connecting terminals may be provided with a supporting piece 38 having a guide groove 36 for readily fitting the coil spring 26 and/or the opposite wall 12 of one chamber 16 may be provided with semicircular holding pieces 40, 40 for the purpose of easy fabrication and convenient operation. In this case, each holding piece 40 at its peripheral edge is provided integrally with a flange 42 for serving as a guide and a stopper upon connection to the toy body, as described hereinafter.

Mounting of the cassette-type power unit to the motor toy will be described with one preferred embodiment.

Figures 5A, 5B, 6:
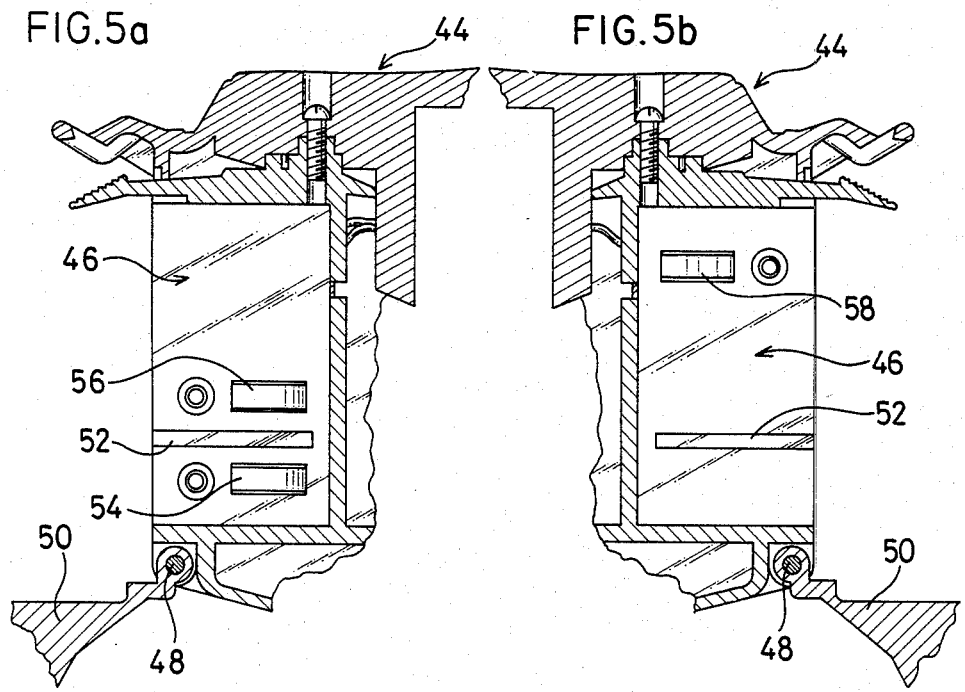
FIGS. 5a and 5b are schematic sectional views of a power unit-receiving chamber arranged in the motor toy for mounting the cassette-type power unit according to the invention.
FIG. 6 is a pictorial side view of the motor toy of FIG. 4 in one running position.

FIG. 4 shows a wireless controllable tricycle 44, which at its rear side is provided with a power unit receiving chamber 46 having a cover plate 50. The cover plate 50 at its lower edge is pivotted to the rear end of the chamber 46 with a pin 48 for convenient opening. Further, the chamber 46 on its either inner face is provided with opposite guide grooves 52, 52 for smooth reception of the power unit 10. Into the guide groove 52 is fitted a straight portion of the flange 42 of the power unit 10, while the other end of the flange 42 serves as the stopper through contact thereof with the inlet edge of the chamber 46. As shown in FIGS. 5a and 5b, the power unit receiving chamber 46 at its inner face is provided with contacts 54, 56, 58 which are elastically contacted to the corresponding contact pieces 30, 32, 34 on the outer face of the inserted power unit 10.

Thus, the batteries may be conveniently replaced simply by opening the cover plate 50, inserting the power unit 10 with the full batteries into the chamber 46 and then closing the cover plate 50. The replacement of the batteries or the power unit may be carried out through the simple operation in a small space only for finger operation without any danger of damaging the toy body. Further, the contacts 54, 56 may be used as the power source for the wireless receiver, while the contacts 54 and 58 on one hand and the contacts 56 and 58 on the other hand may be used as the power sources for the driving motor and the direction-changing motor, respectively.

As described hereinabove, the toy car with the cassette-type power unit according to the invention may put its center of gravity on the rear wheels 60, 62 as best shown in FIG. 6. The positioning of the chamber 46 behind the rear axle may put the center of gravity in the vicinity of the rear axle. Thus, if the rear wheels 60, 62 are used as driving wheels, then front wheel 64 may be lifted upon running, thereby to provide an interesting toy car. In order to prevent the car body from tumbling backward, the cover plate 50 at its outer surface may be provided with an auxiliary wheel 66.

It will be appreciated from the previous embodiment that the cassette-type power unit according to the invention allows the convenient replacement because a plurality of batteries may be previously charged into the power unit before its mounting to the toy car. Further, the arrangement of the contact pieses on the cassette casing for obtaining a desired voltage enables a variety of controlling operations to be readily effected by a single power unit. Furthermore, the cassette-type power unit, when received in the rear side of the car body, allows the convenient replacement as well as the interesting runing operation with its front wheel being lifted.

Although, the invention has been described with preferred embodiments, it will be appreciated that many variations and modifications may be made without departing from the spirit and scope of the invention. For example, the cassette-type power unit according to the invention may be applied not only to the running toy car, such as bicycles, tricycles or automobiles, but also to any other non-running motor toys.

What is claimed is:

1. A cassette-type power unit for a motor toy which comprises a rectangular casing provided at its middle part with a partition, at either side of which is arranged each battery chamber for receiving a plurality of batteries in parallel, forming two battery layers; connecting terminals for ensuring all batteries in the battery chambers to be connected in series; contact pieces provided as power terminals on an outer face of the casing and conductive to an extreme pair of and a middle one of said connecting terminals; and holding pieces protruded from the casing at its opposite sides, each of said holding pieces being provided with a flange for serving as a guide and a stopper upon connection to the motor car.

2. A cassette-type power unit according to claim 1, wherein the connecting terminals in each battery chamber comprise positive terminals of conductive eyelets and negative terminals of conductive coil springs, said eyelets and said coil springs being disposed alternatively along two opposing sides of each of said battery chambers with said eyelets and said coil springs in a first of said battery chambers aligned, respectively, with said coil springs and said eyelets in a second of said battery chambers, a connection between said batteries being effected by a portion of one of said coil springs in contact with an adjacent one of said eyelets.

3. A cassette-type power unit according to claim 1, wherein the motor toy car is wireless controllable toy car in which a car body at its rear end is provided with a receiving chamber having an openable cover plate for the power unit.

4. A cassette-type power unit according to claim 3, wherein the power unit is applied to power sources for a wireless receiver, for a driving motor and for a direction-changing motor.

5. A cassette-type power unit according to claim 3, wherein the receiving chamber for the power unit is located behind a rear axle, in the vicinity of said rear axle being located a center of gravity of the car body and said cover plate at its outer face being provided with an auxiliary wheel.

* * * * *